Aug. 21, 1934.　　　W. K. ATCHESON　　　1,970,725
BRAKE EQUALIZING MEANS
Filed Nov. 22, 1929
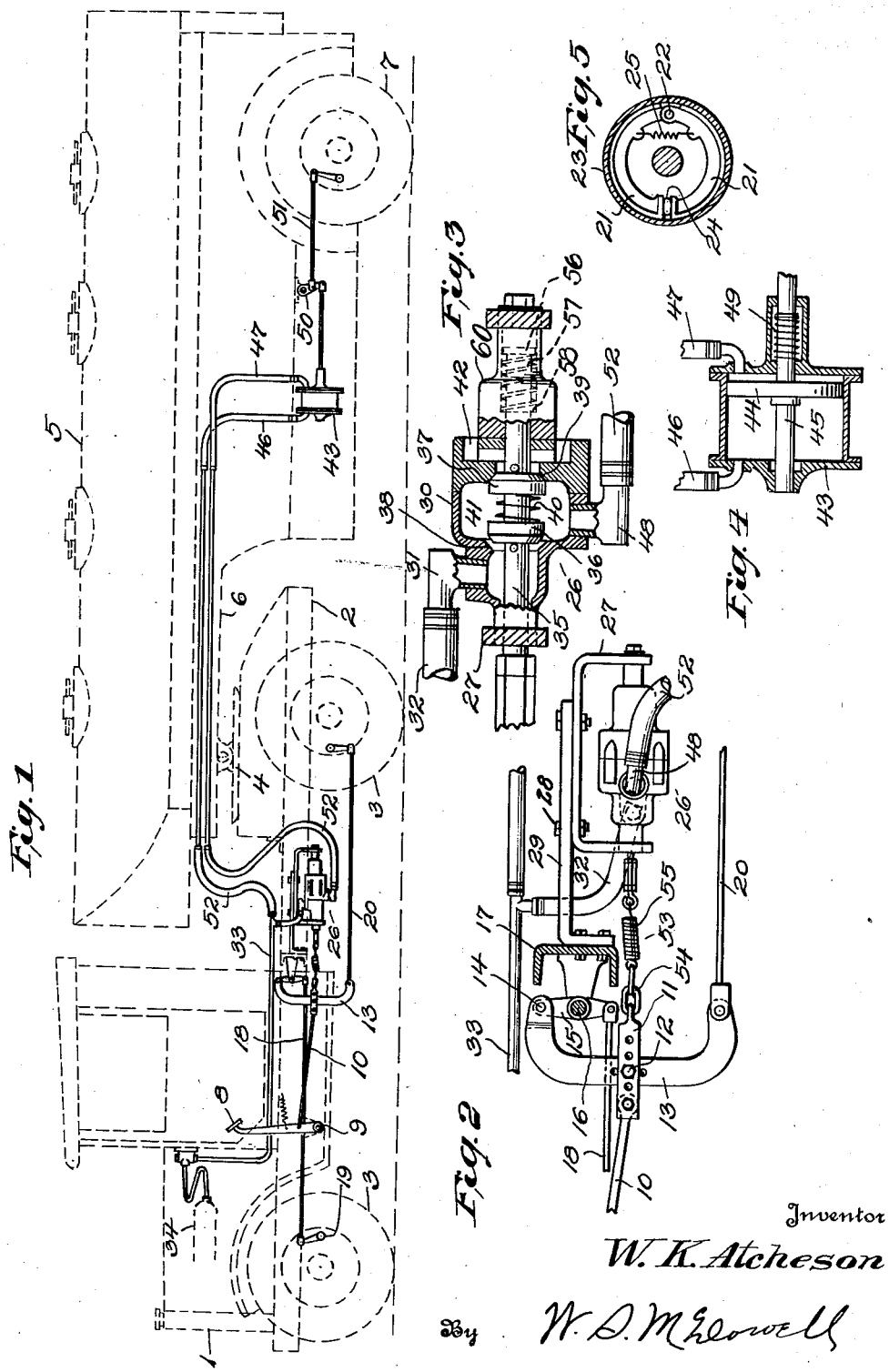
Inventor
W. K. Atcheson
By W. D. McDowell
Attorney Patented Aug. 21, 1934

1,970,725

UNITED STATES PATENT OFFICE 1,970,725

BRAKE EQUALIZING MEANS

Windsor K. Atcheson, Columbus, Ohio, assignor to The Pure Oil Company, Chicago, Ill., a corporation of Ohio Application November 22, 1929, Serial No. 409,104

3 Claims. (Cl. 188—3)

This invention relates to improvements in brake equalizing means for motor operated vehicles and has particular application to the brake mechanism of draft coupled vehicles wherein a tractor or truck is employed to effect the propulsion of one or more trailing vehicles and wherein the vehicles are provided with brake mechanisms under the control of the operator of the propelling or truck vehicle.

In accordance with the present invention the truck or propelling vehicle is provided with mechanically operated brakes under control of a single actuating pedal and the drawn or trailing vehicle or vehicles is provided with pneumatic brakes operated by power derived from the internal combustion engine of the forward or propelling vehicle and wherein an improved arrangement is provided whereby upon the operation of the single brake actuating pedal on the propelling vehicle the brake mechanisms on all of said vehicles may be applied in an equalized manner for the purpose of securing uniform brake action on the part of the connected vehicles and specifically to avoid excessive brake action on the wheels of any one of said vehicles.

Heretofore in draft coupled vehicles of this character wherein the propelling vehicle is provided with mechanical foot actuated brakes and the trailing vehicle provided with pneumatic brakes, the control mechanism has been such as to cause the operation of the pneumatically set brakes on the trailing vehicle to a far greater extent than the brakes on the propelling vehicle with the result that the brake mechanism and the tires on the wheels of the trailing vehicle receive the greatest wear and tear and in addition the brake action itself lacks smoothness with rapid deceleration of vehicle movement.

The present invention overcomes these disadvantages by the provision of an equalizing mechanism which permits of co-ordinated braking action on all of the wheels of the connected vehicle employed in the braking operation and one wherein the brakes of the forward or propelling vehicle are applied with the same frequency and braking effect as the brakes of the rear or trailing vehicles.

It is another object of the present invention to provide a flexible connection between the operating mechanism of the mechanical brakes of the propelling vehicle and the regulating valve provided for the pneumatic brakes on the trailing vehicle whereby by the employment of said flexible connection a predetermined operation of desired degree on the part of the mechanical brakes of the propelling vehicle may be secured prior to the actuation of the regulating valve of the pneumatic brake system, in order that the slower acting mechanical brakes may exercise a braking influence at the time of application of said pneumatic brakes.

With these and other objects in view which will appear as the description proceeds, the invention comprises the novel features of construction, combinations of elements and arrangements of parts hereinafter to be fully described and pointed out in the appended claims.

In the accompanying drawing:

Figure 1 is a diagrammatic view in side elevation of the brake operating mechanism comprising the present invention, Figure 2 is an enlarged view in side elevation of the equalizing means for use in applying the mechanical brakes and the loose or flexible connection between said equalizing means and the regulating valve unit of the pneumatic brakes, Figure 3 is a detail sectional view taken through the valve unit of the pneumatic brakes, Figure 4 is a similar view of the operating cylinder used in connection with the pneumatic brakes, and Figure 5 is a detail vertical sectional view of the brake shoe construction used in connection with the brake wheels of the associated vehicles.

Referring more particularly to the drawing, the numeral 1 designates a propelling unit which may consist of a motor operated truck or tractor, the later being provided with the usual frame 2 and supporting wheels 3. The rear of the frame 2 is provided with a compound pivotal connection 4 by which the front end of a trailer vehicle 5 is coupled in draft relation with the rear of the propelling vehicle. The trailer vehicle or unit also comprises a frame 6, the forward portion of which is pivotally connected by the coupling 4 to the rear portion of the unit 1, while the rear portion of the frame 6 is supported by means of brake equipped wheels 7.

The brake mechanism for the propelling unit 1 is of the foot operated manual type of the conventional form found in connection with vehicles of this character. This brake mechanism is operated by the customary foot pedal 8 pivotally mounted in connection with the frame 2 as at 9. Connected with the pedal 8 is a rearwardly and longitudinally extending rod 10 which has its rear portion pivotally connected with a link 11. This link in turn is pivotally mounted as at 12 upon the intermediate portion of a floating yoke 13. The upper arm of the yoke 13 is pivotally connected as at 14 with a lever 15, the latter being pivotally mounted as at 16 upon a fixed cross member 17, which forms a part of the frame 2. The lever 15 is pivotally mounted intermediately of its ends, the upper end thereof being pivotally connected as at 14 with the yoke 13, while the lower end of said lever below its pivotal mounting 16 is connected with a forwardly extending rod 18. This rod extends to the brake mechanism 19 mounted upon the forward pair of wheels 3. The brake mechanism on the rear pair of wheels 3 is operated by means of a rod 20 which is pivotally connected with the lower portion of the yoke 13. By this construction the actuation of the pedal 8 results in moving the equalizing yoke 13 in order to impart balanced pulling force to the rods 18 and 20 for the purpose of uniformly applying the brakes carried by the wheels 3. It will be understood that these brakes may be of any conventional form such as is illustrated in Figure 5 wherein the brake shoes 21 are pivotally united as at 22 for expansion movement within the brake drum 23, a cam 24 being disposed between the meeting ends of the shoes 21 and so formed that upon rotation the shoes will be forced outwardly against the resistance of the spring 25 into braking engagement with the inward peripheral surfaces of the drum 23. It will be understood that the movement of the rods 18 and 20 results in the rotation of the cam or cams 24. Since the brake drums are directly connected with the wheels 3 a positive braking effect is exerted.

The trailer vehicle 5 is provided with a vacuum brake system of standard construction. In such pneumatic brake system use is made of a regulating valve unit 26. In accordance with the present invention this unit, instead of being mounted on the rod 10 as heretofore, is carried by a yoke 27, as shown in Figure 2, this yoke being adjustably secured by means of the threaded connections 28 in a stationary bracket 29 connected with the cross member 17 of the frame 2.

While the present invention is not directly concerned with the constructional features of the pneumatic brake system, a short description thereof will be given to clarify the features of the present invention. The valve unit 26, as shown in Figure 3, consists of a casing 30 provided at one end with an L-shaped fitting 31, to which is connected a hose 32 which leads to a pipe 33 which extends to the intake manifold 34 of the internal combustion engine employed for effecting the operation of the propelling unit 1. Slidably mounted within the casing 30 is a rod 35 which carries spaced valve heads 36 and 37 which are arranged for co-operation with a pair of seats 38 and 39. Normally the head 37 is held in contact with the seat 39 by the employment of a light spring 40. Within the casing there is provided a vacuum chamber 41 which communicates with the manifold 34 under normal conditions of operation. However, when the valve head 37 is moved away from the seat 39, as is accomplished by the operation of the pedal 8, atmospheric air may enter the chamber 41 by way of the ports 42 and at the same time communication between the chamber 41 and the manifold 34 is arrested by the engagement between the valve head 36 and the seat 38.

In addition to the regulating valve the pneumatic brake systems include an operating cylinder 43 which is mounted in connection with the frame 6 of the trailer vehicle. Within this cylinder there is situated a piston 44 which is carried by a rod 45. One side of the cylinder 43 is connected with a conduit 46 which communicates with the manifold 34, while the piston side of the cylinder is connected with a conduit 47 which extends to a fitting 48 which enters the casing 30 and the chamber 41 formed therein. Normally, the piston 44 is retained in one end of the cylinder 43 by a light spring 49. The rod 45 is connected with a pivoted lever 50 at its outer end and the bar 50 is in turn connected with a brake rod 51 which is employed to control the operation of the brake mechanism mounted in connection with the wheels 7 of the trailer vehicle and which brake mechanism may be of the type illustrated in Figure 5. The conduits 46 and 47 have flexible connections as at 52 with the pipe 33 and with the fitting 48 in order to compensate for variations in position between the forward end of the trailer unit and the rear portion of the propelling unit.

In the operation of the pneumatic brake mechanism, the movement of the rod 35 which carries the heads 36 and 37 in a braking direction, which is forwardly, results in opening the port controlled by the head 37, and the closing of the port governed by the head 36. This results in permitting atmospheric air to enter the chamber 41 and likewise, by the provision of the conduit 47 atmospheric pressures then obtain on one side of the piston 44 in the cylinder 43. Due to the fact that a partial vacuum is maintained on the other side of the piston 44 by the conduit 46 which extends to the manifold 34, the piston 44 is moved forwardly in order to operate, that is, apply, the brake mechanism carried by the wheels 7. To effect the release of the vacuum applied brakes on the trailer vehicle, the rod 35 is provided at its rear end with a shoulder 56 which engages one end of a spring 57, compressiing it against an abutment 58 provided in connection with the housing 60. When the tension on the rod 35 is released, the spring 57 will cause it to move rearwardly, unseating the valve 36 and seating the head 37 against the seat 39 connecting the line 52 once more with the vacuum line and equalizing the pressure on both sides of the piston 44. The spring 49 will then exert its force to effect the release of the brakes.

It will be seen that slight movement on the part of the rod 35 results in the operation of the pneumatic brake mechanism. Heretofore the valve unit 26 has been connected directly with the operating pedal 8 so that the initial movement of said pedal in a braking direction has resulted in the operation of the pneumatic brake mechanism, since in order to apply the manual brakes of the propelling or truck unit a greater degree of rocking movement on the part of the pedal 8 has been required. Thus the driver of such a vehicle has relied principally on the pneumatic brake mechanism to check the movements of the connected vehicles, since but slight movement of the pedal 8 has brought about this result. Thus the pneumatic brakes have been used as service brakes for by far the greater majority of braking operations and the mechanical brakes on the unit have been used but slightly due to the extra effort and movement required to effect their application. As a result of this previous arrangement, the wheels 7 have performed the greater part of the braking operations and correspondingly have received the greatest wear and, furthermore, their braking operation has not been satisfactory for the reason that but two of the wheels were in use as brakes and these wheels were situated at the rear of the trailing vehicle, producing irregular and largely uncontrolled braking forces.

To avoid this condition the regulating valve unit 26 in the present invention has been rigidly mounted in connection with the frame 2 of the propelling vehicle and in addition there is provided a flexible connection 53 between the link 11 and the forward end of the rod 35. The connection 53 is such that there normally exists a certain degree of slack or looseness therein and to insure this the connection consists of a chain section 54 and a helical spring 55. Thus when the operator of the vehicle depresses the pedal 8 the brake mechanism of the propelling unit, as actuated by the yoke 13, is initially applied by the time the slack or looseness in the connection 53 has been taken up. Then, the continued forward or depression movement of the pedal 8 results in the operation of the rod 35 and the corresponding operation of the valve heads 36 and 37. This movement, however, is so co-ordinated that the mechanical brakes of the propelling vehicle are in positive application at the time the brakes of the pneumatic system are being applied.

This arrangement while simple in construction and application is highly effective in providing for uniform braking effect on the part of the six or more wheels employed in draft united vehicles. All of the braking wheels operate to a substantially uniform degree although their respective times of application is subject to control by the degree of slack present in the connection 53 and by varying the pivotal connection 12 between the yoke 13 and the link 11.

What is claimed is:

1. In brake controlling mechanism for motor vehicles, the combination with a motor propelled truck vehicle, a trailer vehicle coupled with the truck vehicle in draft relation with respect thereto, manually operated mechanical brakes mounted in connection with the wheels of the truck vehicle, a brake mechanism for the wheels of the trailer vehicle pneumatically operated by power obtained from the motor of the truck vehicle, said pneumatic brake mechanism being formed to include a control valve, a manually controlled operating member for the brakes of both of said vehicles carried in connection with the truck vehicle, a rigid connection between said operating member and the mechanical brakes of said truck vehicle, a flexible connection between said operating member and the control valve of said pneumatic brake mechanism, said connections permitting of partial application of the brakes on the truck vehicle upon initial movement of said operating member from a brake releasing to a brake applying position, and simultaneous operation of both the mechanical and pneumatic brakes when said operating member assumes its full brake applying position.

2. In a motor vehicle brake system, the combination with a self-propelled truck vehicle and a draft coupled trailer vehicle, mechanically actuated brakes for the truck vehicle, pneumatically operated brakes for the wheels of the trailer vehicle, said pneumatic brakes including a control valve stationarily carried in connection with the truck vehicle, a port controlling member in said valve, a single manually operated member for both sets of brakes mounted in connection with the truck vehicle, a direct connection between said operating member and the mechanically actuated brakes, and a lost motion connection between said operating member and port controlling member, said lost motion connection permitting of the movement of the direct connection for the partial actuation of the mechanical brake mechanism of said truck vehicle in advance of the movement of the port controlling member to effect the operation of the pneumatic brake mechanism of the trailer vehicle.

3. In a motor vehicle brake system, the combination with a motor driven truck vehicle and a draft coupled trailer vehicle, mechanically operated brake mechanism mounted in connection with the wheels of the truck vehicle, fluid actuated brake mechanism mounted in connection with the wheels of the trailer vehicle, a manually operated foot pedal movably carried by the truck vehicle, connecting means directly uniting the brakes of the truck vehicle with said pedal to cause direct response of the truck vehicle brakes to the movement of said pedal, a control valve carried by the truck vehicle for governing the operation of the fluid applied brakes of the trailer vehicle, and a flexible and resilient connection joining said pedal with said control valve, said last-named connection being operative to require partial application of the brakes of the truck vehicle prior to effecting the operation of said control valve to obtain corresponding application of the brakes of the trailer vehicle.

WINDSOR K. ATCHESON.